(No Model.)
G. FROH.
GLOBE FOR GAS OR OIL LAMPS.
No. 424,776. Patented Apr. 1, 1890.
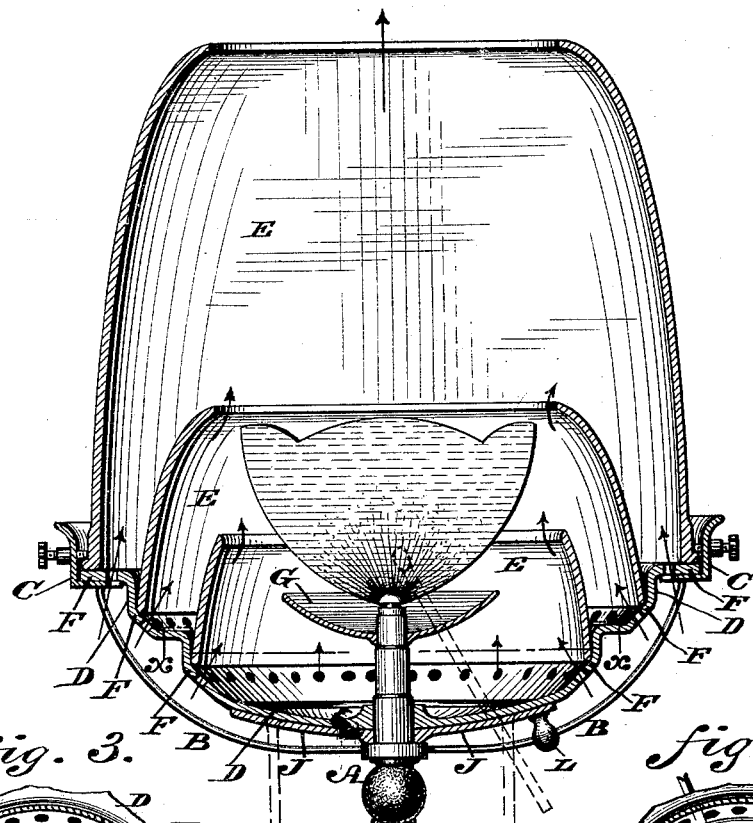
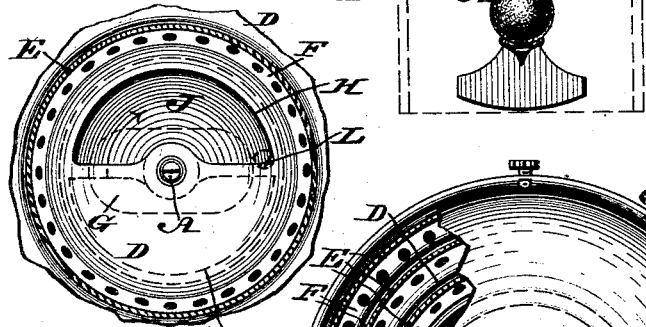
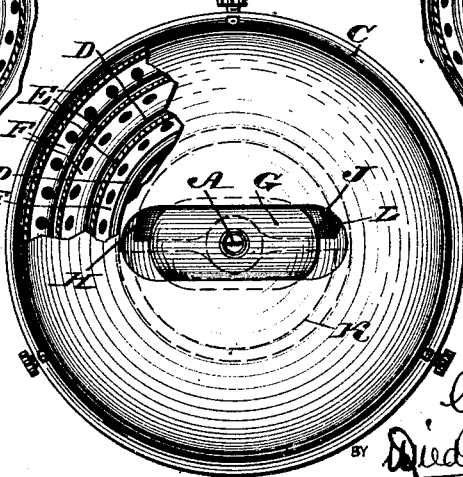
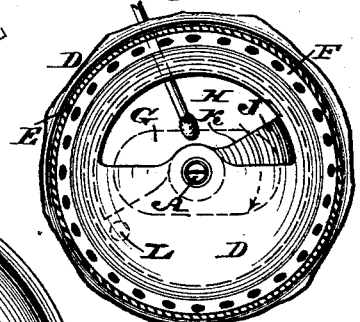
WITNESSES:
L. Douville
P. F. Daglès
INVENTOR:
George Froh
BY Niedersheim & Kintner
ATTORNEYS.

ature.

UNITED STATES PATENT OFFICE.

GEORGE FROH, OF PHILADELPHIA, PENNSYLVANIA.

GLOBE FOR GAS OR OIL LAMPS.

SPECIFICATION forming part of Letters Patent No. 424,776, dated April 1, 1890.

Application filed April 19, 1889. Serial No. 307,820. (No model.)

*To all whom it may concern:*

Be it known that I, GEORGE FROH, a citizen of the United States, residing in the city and county of Philadelphia, State of Pennsylvania, have invented a new and useful Improvement in Globes for Gas or Oil Lamps, which improvement is fully set forth in the following specification and accompanying drawings.

My invention consists of a globe for a gas or oil lamp formed of a number of globes or shades having their upper ends deflected inwardly, whereby air is directed to the flame in warmed condition and permitted to expand, thus producing a brilliant and steady light.

It also consists of a shouldered support for the globes, the same being perforated and serving to admit air into the globes, thus supplying air to the flame at different altitudes.

It further consists of an elliptical guard or shield on the burner for preventing air from directly reaching the flame from below, whereby thinning of the flame is obviated.

It also consists of means for permitting the insertion of a match, taper, &c., for lighting the lamp from below.

Figure 1 represents a central vertical section of a lamp embodying my invention. Fig. 2 represents a top or plan view thereof, on a reduced scale. Figs. 3 and 4 represent horizontal sections on line *x x*, Fig. 1, on a reduced scale, showing parts in different positions.

Similar letters of reference indicate corresponding parts in the several figures.

Referring to the drawings, A designates a gas-burner, and B designates arms, which are connected with the burner and sustain a rim C, from which latter depends a support D for the globes E of the lamp, said support being formed of a dishing plate having a number of shoulders F, with which the bases of the globes engage, the plate being perforated, whereby air is admitted within the globes. The globes are deflected inwardly, so as to overhang inwardly at top, the central opening being oblong, so as to accord with the shape of the flame below the same.

Secured to the burner is a deflector G, which is dishing and made narrow, so as to accord with the shape of the flame above the same, its object being to prevent air from puffing against the flame and thinning the same.

In the bottom of the support D is an opening H, the same being adapted to be covered by a plate J, which is rotatively mounted upon the burner, said plate having an opening K, which may be placed in communication with the opening H by properly rotating the plate, whereby a match, taper, &c., may be inserted through the two openings, and thus reach the burner for lighting the lamp, as is evident. When the plate is rotated in reversed order, the opening H is closed, the rotating being accomplished by a knob or finger-piece L, conveniently located. It will be seen that air passes through the perforations of the support D and enters the globes E, wherein it is warmed and directed to the flame, and it is permitted to expand in the globes, thus steadying the flame. As the air is fed or supplied to the flame in great volumes at different altitudes, said flame is brilliant without necessarily consuming much gas.

The globe is readily adapted for oil-lamps, in which case a proper burner is substituted for the gas-burner. The support is sustained on the collar of an oil-lamp, said collar being shown in dotted lines, Fig. 1.

The globes, support, and deflector are formed of transparent material, preferably glass, which retains heat and prevents the formation of shadows below the lamp.

Having thus described my invention, what I claim as new, and desire to secure by Letters Patent, is—

1. The combination of a burner, a rim supported thereon, a support consisting of a dishing plate having shoulders with perforations therein, and a series of concentric globes having inwardly-deflecting upper ends and resting on said shoulders, substantially as described.

2. The combination of a burner, a rim supported thereon, a support having shoulders with perforations therein, concentric globes with inwardly-deflected upper ends and resting on said shoulders, and a dishing and narrow deflector, the said globes having their central openings oblong and similar to the shape of the deflector, substantially as and for the purpose set forth.

3. The combination of a burner, a rim supported thereon, a support having shoulders with perforations therein and provided with an opening H, globes on said shoulders, and a rotatable plate on said burner beneath said support and having on its under side a knob and provided with an opening K, said openings H and K being so placed in said support and plate as to register when said plate is properly rotated, substantially as and for the purpose described.

GEORGE FROH.

Witnesses:
 JOHN A. WIEDERSHEIM,
 L. JENNINGS.